United States Patent [19]

Sterlini

[11] 4,329,788

[45] May 18, 1982

[54] PROCESS FOR SEPARATING A GAS AND A CONDENSABLE VAPOR

[75] Inventor: Jacques Sterlini, Paris, France

[73] Assignee: CEM Compagnie Electro-Mecanique, Paris, France

[21] Appl. No.: 112,601

[22] Filed: Jan. 16, 1980

[30] Foreign Application Priority Data

Jul. 7, 1978 [FR] France .................................. 78 20363

[51] Int. Cl.$^3$ ................................................ F26B 3/04
[52] U.S. Cl. .......................................... 34/27; 34/32; 34/35; 34/86; 34/77
[58] Field of Search ................... 34/27, 32, 50, 77, 35, 34/86

[56] References Cited

U.S. PATENT DOCUMENTS 4,209,914  7/1980  Gustafsson ............................. 34/77

FOREIGN PATENT DOCUMENTS

1347558  11/1963  France .

*Primary Examiner*—Larry I. Schwartz
*Attorney, Agent, or Firm*—Burns, Doane, Swecker, & Mathis

[57] ABSTRACT

A process is provided for the separation of a gas and a condensable vapor present in the gas. The vapor-containing gas is contacted in a condensation zone with a heat-exchange fluid to cool the gas whereupon the vapor condenses and is collected as condensate. The condensate is then contacted with the heat-exchanger fluid to cause it to vaporize.

10 Claims, 8 Drawing Figures

PROCESS FOR SEPARATING A GAS AND A CONDENSABLE VAPOR

BACKGROUND OF THE INVENTION

This invention relates to the separation of a gas and a condensable vapor present in the gas.

The problem of the separation of a hot gas which contains a condensable vapor, such as, for example, water vapor-containing air, arises in numerous instances. These instances include the drying of air during recycling in an industrial drying process, or the purification of a gas produced during a high temperature process which is loaded with water vapor. Such is particularly the case in the production of hydrogen by means of electrolysis at high temperature.

In the conventional process for the production of hydrogen, the electrolyzing cells normally operate at a temperature of about 80° C. so that the partial pressure of the water vapor, produced by the contact of hydrogen with the electrolytic bath, is relatively low. To separate this vapor from the hydrogen, it is sufficient to pass the gas over a refrigerating beam. Under such conditions, the quantity of lost heat, corresponding to the latent heat of vaporization of the water, is not significant enough to justify the implementation of means to recover it.

In order to increase the output of the electrolytic cells and to reduce the investment cost per kilogram of hydrogen produced, the production of hydrogen at a temperature in the 200° C. range and at a pressure in the 30 bars range is now being considered. The partial pressure of the water vapor, due to the presence of the concentrated solution of electrolyte, is accordingly around 10 bars. The lower partial pressure is due to the concentration in electrolyte being about 6 bars. The loss of the latent heat of this water vapor, produced at the same time as the hydrogen, could significantly lower the output of the electrolytic cells if the major portion of the latent heat were not recovered by means of an appropriate thermodynamic process during the separation process.

Methods and devices for an optimum implementation of some thermodynamic process are known. Such means and devices have been described, for example, in the French Pat. Nos. 75 114 38 (published under Nr. 2307227), 76 14965 (published under Nr. 23 52 247), and 77 07041. These patents pertain to systems which will hereafter be called "polytropic machines," and are herein incorporated by reference.

These machines consist of a series of cells having stepped pressures/temperatures, in which a working fluid present in each cell circulates as a saturating vapor in contact with its liquid. In addition, there exists, at least in some cells, one or more heating or cooling beams connecting the cells with temperature-bearing fluids which bring heat from a heat generating source or extract the heat present therein for use elsewhere. Finally, each cell is linked to the next cell or cells, depending on whether the primary heat entering the process is available, on the average, at a low or high temperature level, whether the vapor ascends or descends different levels of pressure/temperature, and, on the path of the liquid, which circulates in a direction opposite to that of the vapor, and in even quantity through an opening gauged to descend the levels of pressure/temperature, or through a pump to ascend them. In order to be familiar with the structure and operation of such devices, the artisan need only review the disclosure of the above-mentioned patents.

In cases where the temperature-bearing fluid transports heat (it circulates through a series of steps in the direction of the decreasing temperatures), vapor of the working fluid is produced by the boiling of the liquid contained in the cell, and, accordingly, vapor from the working fluid condenses. Thus, the output of vapor and liquid evolves from step to step according to the quantity of heat added or subtracted, in compliance with the law Q(T), according to which the addition or subtraction of heat is achieved; that is to say, as a function of the size of the exchange beams on a practical basis.

It must be noted that at the interface of two successive cells, the total amount of working fluid entering as a vapor or liquid is always equal to the sum of the working fluid coming out as liquid or vapor, with the output of vapor or liquid circulating in the opposite direction being always equal.

It should also be noted that the polytropic machines described in the above-mentioned patents could consist of a simple elementary series, four of which are as follows, to wit:

(1) Cooling off series with compressors, used for a "condensation process with absorbed work."

(2) Heating up series with compressors, used for a "boiling process with absorbed work."

(3) Cooling off series with turbines, used for a "condensation process with provided work."

(4) Heating up series with turbines, used for a "boiling process with provided work."

These four elementary series all include a step including an open extremity through which the outputs of liquid and vapor of the working fluid enter and exit, and a step of closed extremity where the working fluid is either entirely vaporized or entirely condensed.

The following Table describes the side where the open step is located, the entrances and exits of the working fluid in relation to the series under consideration, as well as the direction of the temperature-bearing fluid:

| Type of Series | Open Step | Working Fluid | Direction of Temperature Bearing Fluid |
|---|---|---|---|
| Heating up series with compressors | higher temperature | liquid enters vapor exits | decreasing temperatures |
| Cooling off series with compressors | lower temperature | vapor enters liquid exits | increasing temperatures |
| Heating up series with turbines | lower temperature | liquid enters vapor exits | decreasing temperatures |
| Cooling off series with turbines | higher temperature | vapor enters liquid exits | increasing temperatures |

In these systems, the temperature-bearing fluid may go through several successive steps, or one single step. As a limit, we may have a temperature-bearing circuit of the same kind per step of a specific series.

OBJECTS AND SUMMARY OF THE PRESENT INVENTION

An object of this invention is to provide a process and apparatus for separating a vapor of condensable fluid contained in a non-condensable gas.

In one aspect of the invention there is provided a method for separating a gas and a condensable vapor, both initially at high temperature, which includes:

a process of condensation at stepped temperatures without outside work in which the said gas-vapor mixture arriving at high temperature circulates from step to step while keeping sensibly a constant pressure, and is cooled off with successive partial condensations of the vapor, and a process of boiling stepped in pressure and temperature with outside work and in which each step is homologous with a step of the condensation process, where each heated up step of the boiling process receives, as working fluid, a liquid output which is vaporized therein, and where the vapor outputs thus produced go through a series of steps bringing into play outside work, and exit through an extremity step, the said association being such that:

each step of the boiling process receives for its reheating the heat taken at the homologous step of the condensation process, the difference in temperatures between homologous condensation and boiling steps being just sufficient to guarantee an exchange of heat, and the condensates produced in the steps of the condensation process sent, as working fluid, into the boiling process to be vaporized therein, which permits the recovery of an output of vapor at the outlet of one of the extremity steps, the volume of this vapor corresponding to the volume of the condensed liquid and to that of the vapor initially contained in the mixture, while recovering the gas separated from the major portion of vapor which it contained at the beginning.

BRIEF DESCRIPTION OF THE DRAWINGS

The invention will be illustrated without being limited in any manner by the following description of various modes of operation and of their applications, with reference to the annexed drawings in which.

DETAILED DESCRIPTION OF THE INVENTION

To illustrate the basic characteristics of the present invention, we shall consider the ideal case in which, on the one hand, all thermodynamic operations are perfect (which implies the existence of an infinite number of steps, of compressors or of expansions of working fluid with unit output, with differences of exchange temperature being nil) and, on the other hand, in which the process of de-mixing is crossed in a contrary direction by the gas which has been separated, but in a beam of exchange in which the heat exchanges are realized through a wall.

Under those conditions, it is clear that:

1. the gas does not yield any sensible amount of heat; in fact, it enters saturated at a temperature $T_1$ and exits dry at the same temperature, and 2. in a step of the de-mixing process, the heat withdrawn during a condensation step is equal to the heat provided at the homologous boiling step, and this at exactly the same temperature. This means that, under ideal conditions, the amount of the condensed fraction is exactly equal to the amount of the vaporized fraction.

If the de-mixing process is with absorbed work, the present invention contemplates a perfect separator in which the saturated gas enters at a high temperature $T_1$, comes out dry at the same temperature, while the vapor comes out at a pressure equal to the tension of vapor at the $T_1$ temperature; we have introduced into the process a work equal to the reversible work of de-mixing.

If the de-mixing process is with provided work, the enthalpy of the vapor contained in the mixture has been used in such a way that its energy has been integrally transformed into work on the axle of the turbine, while its energy is integrally present in the thermic rejects of the turbine of the step with the lowest pressure.

In actual operation, in which, in fact, the gas would not be brought back to a $T_1$ temperature, the heat transferred from the condensation process to the boiling process, would be, of course, higher than that required to vaporize the transferred condensates.

In order to equalize the volumetric and enthalpic balance of the system, the following two alternatives are possible.

The heat may be withdrawn in the de-mixing process by means of a temperature-bearing circuit of sensible heat circulating in the direction of the increasing temperatures. This can be achieved in the condensation process as well as in the boiling process.

According to a second alternative, an additional output of working fluid can be introduced to be vaporized therein. If the de-mixing process is with absorbed work, the additional output will preferably be introduced at the low temperature step of the condensation process, where it will go through the temperature interval at the same time as the condensate; in the same manner, if the de-mixing process is with provided work, the additional output will preferably be introduced at the step at low level of the boiling process.

Up to now, it has been assumed that the liquid of the working fluid is introduced at the open step of the boiling process, which implies, in particular, that the condensate circulates from step to step in the condensation step to be collected at the extremity step of the process, homologous with the open step of boiling. Another method may be used for transferring the condensate into the boiling process: the condensate may be extracted at each step of the condensation process and introduced directly into the homologous step of the boiling process to be vaporized therein. It goes without saying that this method may be used without departing from the scope of the invention.

Figure 1:
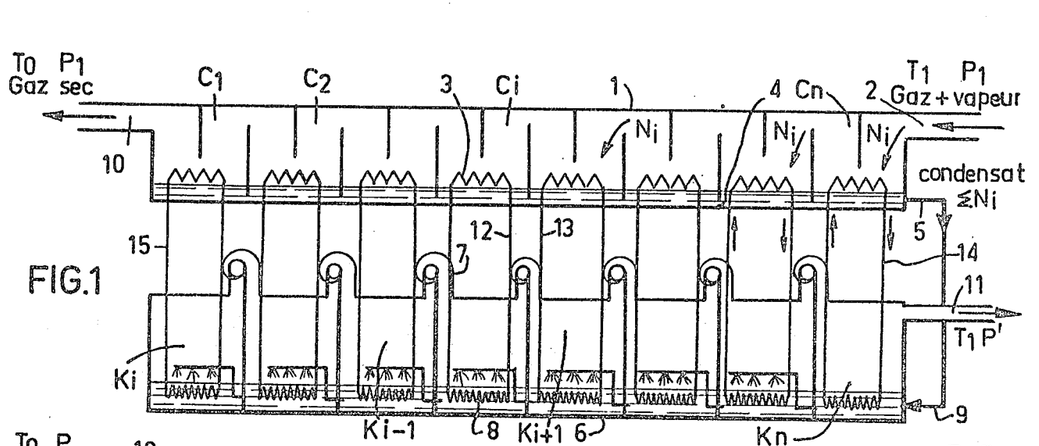
FIG. 1 is a diagram of an installation for the separation of a gas and of a condensable vapor.

FIG. 1 is a diagram of an installation for the separation of a gas and a condensable vapor. The installation includes a series 1 of n cells numbered $C_1$, $C_2$, $-C_i$ ... $C_n$, in the direction of increasing temperature.

These cells are all under the same pressure P and their temperatures are stepped from $T_1$ to $T_o$, $T_1$ being the temperature of arrival of the mixture of gas + vapor which enters into the cell $C_n$ through the orifice 2. Due to the presence of baffles, this mixture passes through each cell contacting a refrigerating beam 3 which is traversed by a temperature-bearing fluid. The vapor contained in the gas thus gradually condenses in each cell. The condensates collect in the lower part of the cell and the dry gas exits through the orifice 10. Orifices 4 permit the condensates to raise the temperatures by heating the cell $C_n$, all of the condensates leaving the cell $C_n$ through the pipe 5. The output of the fluid going through each cell $C_i$ passes into the corresponding cell $K_i$ of a reheated series 6 with compressors, operating between the temperatures $T_o$ and $T_n$, and whose exchange fluid is made up of the condensable fluid coming from the series 1.

The series 6 will be illustrated by means of any cell $K_i$.

A compressor 7 removes, in a known manner, the vapor from the cell $K_{i-1}$ of immediately lower pressure/temperature in order to pass it back into the cell $K_i$. A heating beam 8 passes through the cell $K_i$ to vaporize the fluid going through the cells in a liquid state by decreasing, step by step, the levels of pressure/temperature. The heating beam is looped in a closed circuit with the refrigerating beam 3 of the corresponding cell $C_i$ of the series 1, with a pump, not shown, providing the circulation of the temperature-bearing fluid. It is obvious that the temperature of the cells $C_i$ and $K_i$ are very similar, the temperature of the cell $K_i$ being lower than that of the cell $C_i$ by an amount corresponding to the differences due to the heat exchanges in the beams 3 and 8 serially traversed by the temperature-bearing fluid.

The cell $K_n$ at a temperature $T_1$ of the reheated series 6 with compressors receives through the channel 9 the condensates coming from the series 1 of the condensation cells $C_1$ to $C_n$. A beam 8 heats up each cell $K_i$ by bringing to it the heat of condensation collected by the beam 3 in the corresponding cell $C_i$.

Therefore, the amount of vapor produced in the cell $K_i$ is equal to the amount of vapor condensed in the cell $C_i$ and is added to the vapor brought by the corresponding compressor 7 and it is cooled through contact with the liquid. The total amount of vapor is passed, by the compressor, to the next cell $K_{i+1}$ of higher temperature/pressure, so that from the last cell $K_n$, an output of vapor equal to the output of vapor contained in the gas coming in 2 comes out through the channel 11.

It must be noted that altogether, a volume A of gas enters in 2, at a temperature $T_1$ and at a pressure $P_1$ and that in 10 the dry gas at a pressure $P_1$ comes out and in 11 the vapor at the pressure $P_1$ and temperature $T_1$ comes out.

It is quite clear that, in order to perform an operation of gas drying, for example, if one wishes that the dry gas comes out also at the $T_1$ temperature, it suffices to have it go through exchange beams not shown, and going through preferably the series of cells $C_1$ to $C_n$, in the direction of increasing temperatures.

It will be noted that, in FIG. 1, the temperature-bearing circuits corresponding to the beams 3 and 8 are intended to condense amounts of vapor which are not absolutely equal from one cell to the next. In particular, if the differences in temperature from one cell to the next are identical, 15° C. for example, the amounts of condensed vapor will diminish from cell $C_n$ to cell $C_1$, so that the outputs of temperature-bearing fluid in the beams 3 and 8 will diminish from the n rank to the 1 rank. On the contrary, if it is desired that the condensed amounts maintain constant, the outputs of the temperature-bearing fluid could be identical. In this case, the pipings, such as 12 and 13, could be suppressed which would be traversed by equal outputs in opposite directions, and, on the one hand, all the beams 3 could be serially gathered in the series 1, and, on the other hand, all the beams 8 could be serially gathered in the series 6, so that only the extremity pipings 14 and 15 would be kept, a single pump assuring the circulation of this temperature-bearing output.

If, as noted previously, it is the difference of temperatures between cells that are to be kept constant, a single piping must be maintained between the cell $K_i$ and the cell $C_i$ through which the difference of the outputs of temperature-bearing will pass, a pump removing this difference in output from the link provided between two consecutive beams 8 to bring it to the link provided between the two homologous beams 3.

Figure 2:
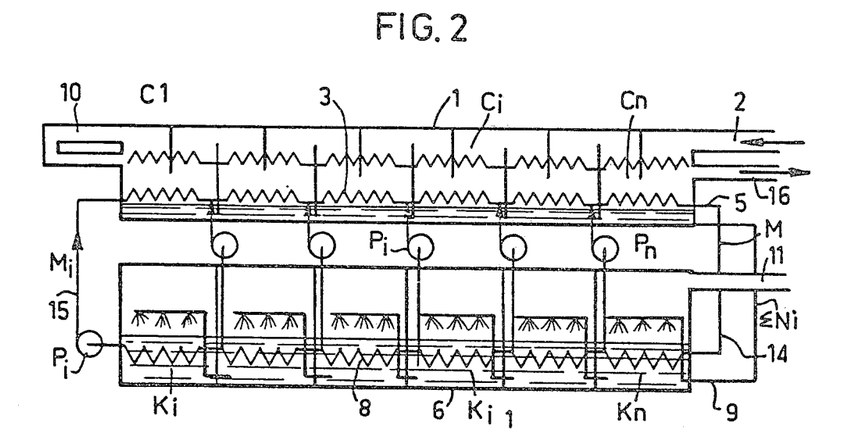
FIG. 2 is a diagram corresponding to a simplified embodiment of FIG. 1.

As seen in FIG. 2, a pump $P_i$ brings to the first cell $C_1$ of the series 1 the temperature-bearing output required for the condensation of the remainder of vapor contained in the gas going through that cell. The pumps $P_i \ldots P_n$ bring the additional output required for each successive cell. The total output of temperature-bearing liquid passes through the channel 14 going toward the cell $K_n$ of the reheated series 6 with compressor, with these compressors not illustrated in the Figure to make it clearer. In FIG. 2 are shown the exchange beams through which the dry gas goes back up to the cells from $C_1$ to $C_n$ to exit through the channel 16 at the $T_1$, $P_1$ stage of that series, as previously described.

The scope of the invention extends equally to the case where, in the series 6 with compressors and in the series 1 of condensation cells, the temperature-bearing fluid is of the same kind as the condensable fluid contained in the gas. In this case, the beams of condensation 3 may be replaced by a system of condensation by mixing, for example, through spraying in the cells $C_1$ to $C_n$ the condensable fluid taken from the cells $K_1$ to $K_n$ by the pumps $P_1$ to $P_n$ whose action and output are the same as those previously described in reference to FIG. 2.

In this case, the channels (5,9) of return of the condensate and (14) of return of the temperature-bearing output could be intermingled, to transport within the condensed quantities $\epsilon_M$ and M of refrigeration. Also in this case, the return of the condensable liquid of a cell $K_{i+1}$ by the "flash" is considerably increased by the temperature-bearing output used for the production of vapor of the cell.

Figure 3:
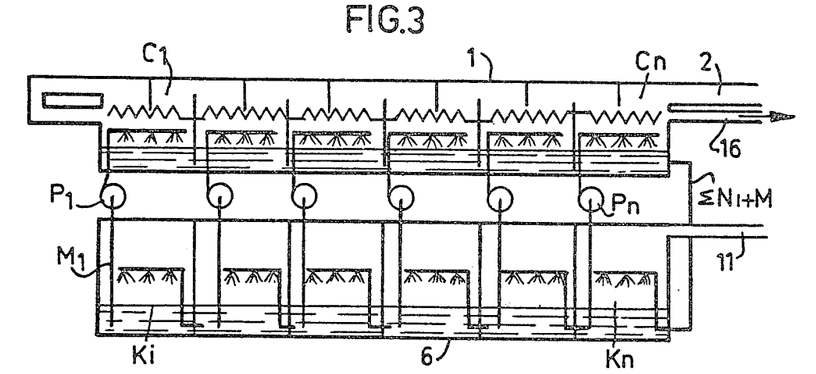
FIG. 3 is a diagram showing the application of the invention to the drying of a gas.

A particularly interesting case is that of the drying of a product, depicted in FIG. 3. The humid gas exiting from a drying room enters into the series 1 through the channel 2 at a $T_1$ temperature. For purposes of drying, it is appropriate to reheat this gas coming through the channel 16 to bring it, at least, to the temperature required for the evaporation of the water contained in the product to be dried. It will be enough to go back to FIG. 2 in which the same reference numbers as those in FIG. 3 have been used.

The invention also pertains to a drying process, taking advantage of the fact that the latent heat required for the evaporation of the water contained in the product to be dried is contained in the vapor coming out through the channel 11 of the reheated series 6 with compressors. Then, according to the invention, the output of vapor coming out through 11 as working fluid in a cooled off series with compressors, in which the temperature-bearing fluid to be reheated, will be the dry gas coming out through the channel 16.

Figure 4:
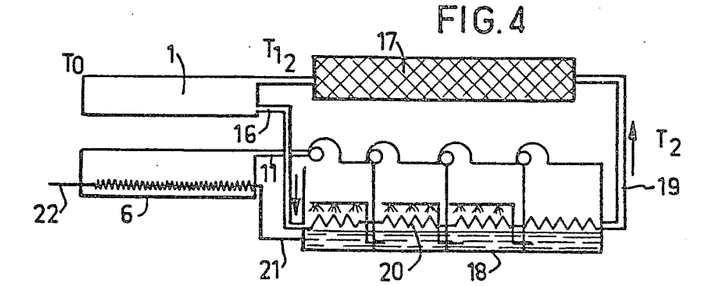
FIG. 4 is a diagram representing an improved embodiment for the drying of a gas.

FIG. 4 depicts such an embodiment in which the principal elements of FIG. 3, that is the series 1 of cells of condensation and the reheated series 6 with compressors are represented only by rectangles.

The material to be dried is placed in a drying room 17. The humid gas exits at 2, enters into the series 1 of the condensation cells, leaves dry at 16, and is introduced in a cooled off series 18 with compressors from which it comes out heated up at 19. The vapor coming out through the channel of the reheated series 6 with compressors, previously described, and the volume of which is equal to the volume of vapor contained in the humid gas, condensed in 1 and revaporized in 6, as previously seen, enters as working fluid in the series 18 with compressors and progressively condenses therein, reheating the dry gas which goes through the beams 20 and comes out of the series 19. The condensates return progressively by "flashing" successively from one cell to the next of the series 18 and come out, in a known manner, in 21 at a $T_1$ temperature which is equal to the temperature at the entrance of the vapor going through the channel 11.

These condensates could conveniently pass again through the reheated series 6 with compressors to bring to it their sensible heat and exit again cooled off in 22.

Figure 5:
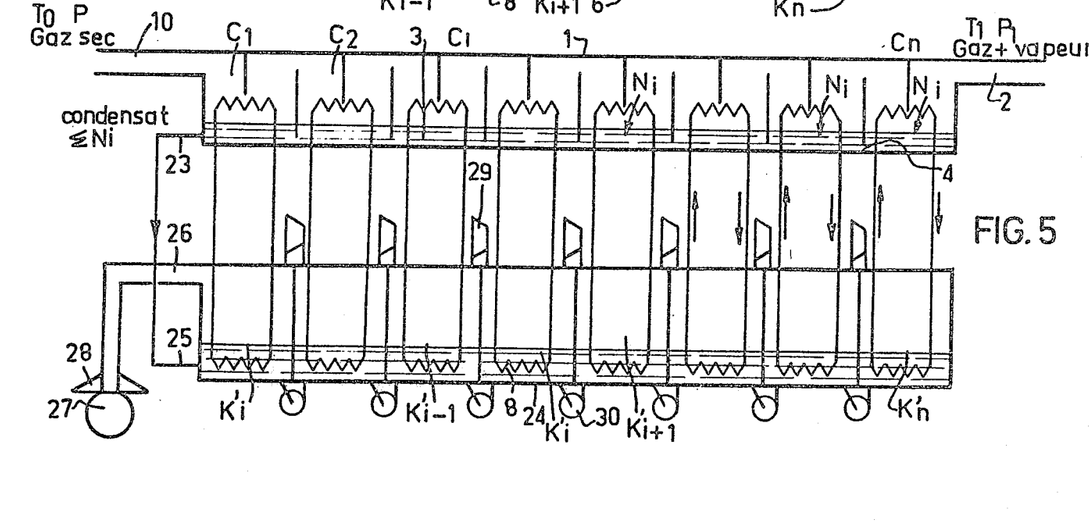
FIG. 5 is a diagram corresponding to an embodiment of FIG. 1.

FIG. 5 is a diagram of another embodiment of the invention for separating a gas and a condensable vapor. This installation includes, as shown in FIG. 1, a series 1 of n cells, numbered from $C_1$ to $C_n$ in the direction of the increasing temperatures $T_0$ to $T_1$, the said series 1 constituting in the same manner an isobar separator with increasing pressure, the gas entering through the orifice 2 and coming out, dry, through the channel 10. Refrigerating beams 3 pass through each cell in the same manner as described previously. They are crossed by an output of temperature-bearing fluid so that the vapor condenses gradually in each cell with the condensates collecting in the lower part. Orifices 4 permit the condensates to pass from one cell to the other in the direction of the low temperature cells to exit through the channel 23. Then, the total production of the condensates is sent as working fluid to a reheated series 24 with turbines with the same number of cells $K'_1 \ldots K'_i \ldots K'_n$ as the separator and operating between the temperatures $T_0$ and $T_1$, and, in which each cell $K'$ is crossed by a heating beam 8 looped in closed circuit with the refrigerating beam 3 of the corresponding cell of the separator 1.

The condensate entering in 25 into the series 24 with turbines is progressively vaporized, the vapor, produced in each cell $K'_i$, going through a turbine step 29 to be admitted in the cell $K'_{i-1}$ of immediately lower pressure/temperature, while the condensate is pumped by means of a pump 30, from cell to cell, toward the cell $K'_{i+1}$ of immediately higher pressure/temperature. The produced vapor comes out in 26 to be sent to a condensor 27, eventually through a turbine 28.

The whole of the turbines is connected to an axle, directly or by means of fittings, in order to drive an electric current generator connected with the general network.

It will be noted that the amount of vapor produced in a $K'_1$ cell of the series with turbines is equal to the amount of vapor condensed in the homologous $C_i$ cell of the separator, and that, altogether, is produced, starting from a gas loaded with vapor at a temperature $T_1$ and a pressure $P_1$, on the one hand, a dry gas at the temperature $T_0$ and at the same pressure $P_1$, and, on the other hand, energy which is usable to drive the turbines.

Figure 6:
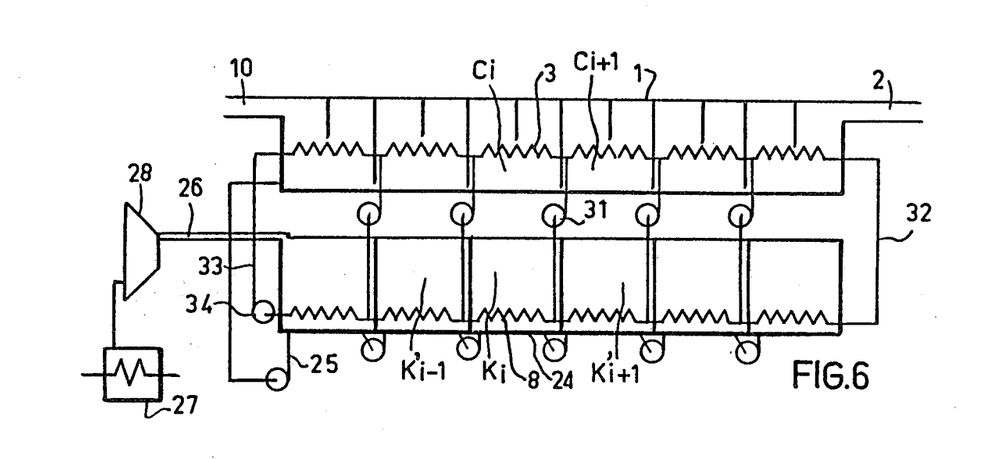
FIG. 6 is a diagram of a simplified embodiment of FIG. 5.

As we have already shown for the separator connected with a series with compressors, the output of temperature-bearing fluid intended for transferring the amount of condensation heat from the separator 1 to a series 24 with turbines, varies from cell to cell. FIG. 6 shows a simplified alternative applicable in the case where the temperature-bearing fluids are of a similar nature.

According to the alternative shown on FIG. 6, the difference of temperature-bearing outputs is pumped from a cell $K'_i$ into a cell $C_i$ and all the refrigerating beams located in the separator 1, on the one hand, and, on the other hand, all the heating beams located in the series 24 with turbines are gathered together. The pump 31 pumps out some temperature-bearing fluid between the heating beam 8 of the cell $K'_i$ and that of the cell $K'_{i+1}$ and pushes it back into the piping connecting the beams 3 of the cell $C_i$ and of the cell $C_{i+1}$ of the separator.

FIG. 6 shows also two extremity pipings 32 and 33 which connect the whole of the refrigerating beams and the whole of the heating beams, directly on the side of the high temperatures, on the one hand, and, on the other hand, by means of a pump 34 on the side of the lower temperatures.

Figure 7:
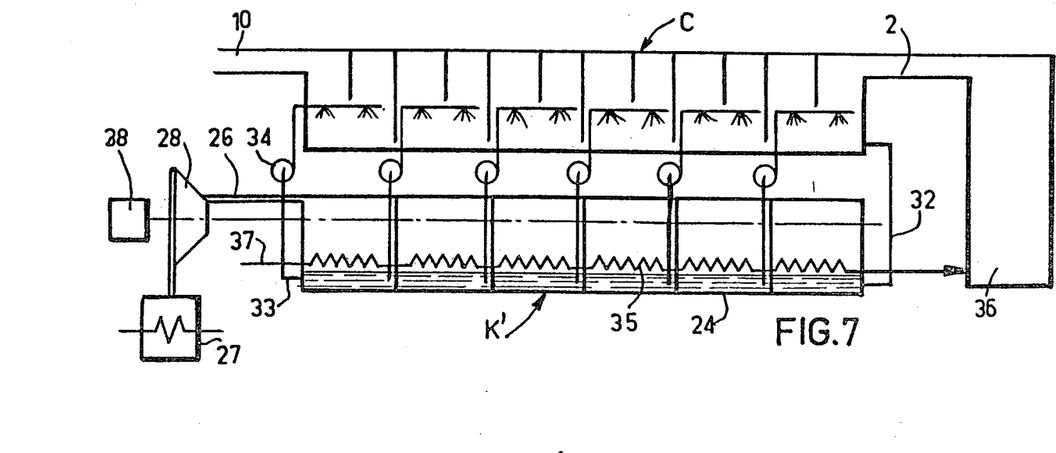
FIG. 7 is a diagram showing the application of the invention to the drying of a gas coming out of an electrolytic cell at high temperature.

In the same way as has been described in the case of the association of a separator with stepped temperatures and of a reheated series with compressors, if the temperature-bearing fluid is of same nature as the condensable fluid contained in the gas, we end up with the embodiment shown in FIG. 7 in which the condensation in the cells C is achieved through mixing and in which the heating is done directly by sending the temperature-bearing fluid through the piping 32. In FIG. 7, the analogous elements are referred to by the same numbers as in FIG. 6.

The output of temperature-bearing fluid being greater than the condensed quantity, this quantity is not carried toward the low temperatures, in this case, but toward the high temperatures, and, on the other hand, into the series with turbines, the whole of the pumps 30 may be suppressed. The vapor produced in the series with turbines still comes out of the series through the channel 26 going toward the last turbine 28 and the condensor 27.

In the case where the setting is used to separate the vapor contained in a gas coming out of an electrolyzer at high temperature, the amount of water coming out of the electrolyzer as vapor, as well as the amount of water dissociated by electrolysis must be replaced. It is advantageous to introduce this water through the series 24 with turbines by sending it through the exchange beams 35 going through all the cells of the series with turbines. It follows that the amount of heat required to bring the water added to the electrolyzer to the temperature of electrolysis will be taken from the latent heat contained in the vapor coming out and mixed with the gas produced.

In FIG. 7, the electrolyzer is shown as a rectangle 36 and the channel bringing the solution to the electrolyzer as 37.

Thus, in the general installation of electrolysis, there enter, on the one hand, the solution to be electrolyzed and, on the other hand the required electrical energy, and there come out through the channel 10 the dry and cold gas under pressure, and the electrical energy recovered from the vapor coming out of the electrolyzer through the turbines connected to the generator represented by the rectangle 38.

If it has a large capacity, an electrolysis installation may be further improved by the embodiment of the invention shown in FIG. 8 and that will be described hereafter.

It must be taken into account that the gas exiting from the electrolyzer contains water vapor whose vapor pressure corresponds to that of a concentrated solution of sodium or potassium hydroxide constituting the electrolyte, and not to that of pure water, so that the partial pressure of the vapor in the mixture coming out of the electrolyzer is lower than the pressure of the saturating vapor in presence of water at the same temperature. The output of gas coming out may be considered as containing overheated vapor as soon as it is no longer in presence of the electrolyte. It is appropriate to recover the sensible heat of this mixture by cooling in an exchanger before the separation, which leads to cooling off the gas from the $T_1$ temperature at the exit of the electrolyzer to a $T'_1$ temperature corresponding to the pressure of the saturating vapor in presence of water.

The de-mixing process is thus fed at the $T'_1$ temperature, which is lower than $T_1$, and the feeding water of the electrolyzer will come out of this process at $T'_1$, which requires its reheating to $T_1$ before introducing it into the electrolyzer.

According to this embodiment of the invention, the de-mixing process will be divided into two parts, one called the "low level process," including as previously specified, a separator associated with a polytropic machine made up of a reheated series with turbines, this process operating between the $T_0$ temperature of the condensor and a $T''_1$ temperature which is lower than $T'_1$.

The other part of the de-mixing, called the "high level process" operates between $T'_1$ and $T''_1$ and it includes a separator associated with a polytropic machine made up of a reheated series with compressors analogous to that of the drying process previously described, the vapor coming out of this reheated series with compressors being used in a cooled off series with compressors through which a portion of the water feeding the electrolyzer is passed, being reheated therein, the other portion going through the above-mentioned exchanger-cooling-off-the-overheating in which it is also reheated to the same degree.

If an appropriate selection of the $T''_1$ temperature is made, the enthalpy contained in the electrolysis effluents may be entirely recovered, the energy provided by the series with turbines being much higher than the energy required for the series with compressors located at a higher level.

Figure 8:
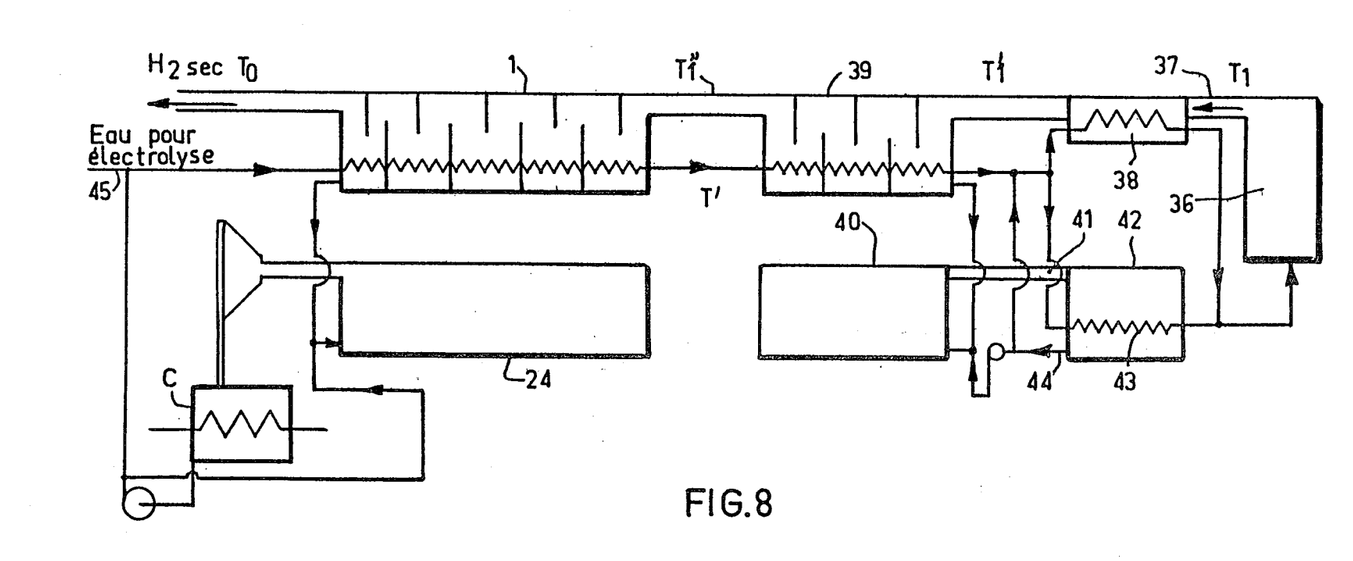
FIG. 8 is a diagram of an improved installation for treating gaseous effluents and effluents from an electrolytic cell at high temperature.

FIG. 8 shows a general diagram of an electrolysis installation operating in this manner, in which the low level process consists of the separator 1 and the series 24 with turbines, operating between the temperatures $T''_1$ and $T_0$, $T_0$ being the temperature of the condensor C. The whole being fed by the gas from the electrolysis at temperature $T''_1$ and saturated with water and discharging at $T_0$ temperature this gas containing the very low amount of water corresponding to the partial pressure of the saturating water vapor at $T_0$ temperature.

The gas coming out of the electrolyzer 36 at $T_1$ temperature, through the channel 37, first goes through an exchanger 38 in which its overheating is cooled off to the temperature $T'_1$, then it enters into the high level separation process comprising a separator 39 and a reheated series 40 with compressors, the open step of this series discharging vapor in volume equal to the volume of the water condensed through the channel 41. This feeds a cooled off series 24 with compressors intended to reheat a portion of the feeding water which goes through it by means of the exchange beam 43, the other portion of the feeding water going through the exchanger 38. The whole of the feeding water is made up, on the one hand, of the condensed water coming out of the cooled off series 42 with compressors through the channel 44, and, on the other hand, of the condensates coming from the series 24 with turbines and from the condensor C which, together with the amounts of water to be electrolyzed coming through the channel 45, go through all the steps of the separators 1 and 39, to be reheated therein.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. A process for drying an article to be dried comprising:

contacting said article in a drying zone with a gas which is at a temperature sufficiently high to dry said article and form a mixture of said gas and a condensable vapor;

removing said condensable vapor from said gas by passing said mixture through a series of separation zones of decreasing temperature to cool said mixture sufficiently to cause said condensable vapor to condense from said mixture, the gaseous mixture being cooled by heat exchange with a heat exchange fluid in each zone which absorbs the heat of vaporization of said condensable vapor, causing said vapor to condense and the heat exchange fluid to increase in temperature;

recovering the condensable vapor-free gas upon passage through said series of separation zones;

recovering the condensate of said condensable vapor from each zone which has been removed from the gaseous mixture;

passing said condensate of said condensable vapor which has been recovered through a series of vaporization zones whereby said condensate passes in heat exchange relationship with said heat exchange fluid and is heated thereby, a gaseous stream comprising said vaporized condensate passing between said vaporization zones countercurrent to said condensate and being compressed as it passes between said zones to increase the temperature thereof, with the heat provided by said compression and by said heat exchange fluid being sufficient to vaporize at least a portion of said condensate;

heating the condensable vapor-free gas which has been recovered by heat exchange with said vaporized condensate; and returning said heated condensable vapor-free gas to said drying zone for further drying of said article.

2. The process of claim 1 wherein said condensate is vaporized in a series of vaporization zones of increasing temperature.

3. The process of claim 1 wherein an equal number of separation and vaporization zones are employed.

4. The process of claim 3 wherein a heat exchange fluid circulates between each separation zone and a corresponding vaporization zone whereby the heat recovered by said heat exchange fluid in said separation zone is employed in the vaporization of said condensate in said vaporization zone.

5. The process of claim 4 wherein the condensate which is recovered in each separation zone is passed to said corresponding vaporization zone.

6. A process for the separation of a gas and a condensable vapor present in the gas comprising:

removing said condensable vapor from said gas by passing a gaseous mixture of said vapor and said gas through a series of separation zones of decreasing temperature at a constant pressure wherein said gaseous mixture is sufficiently cooled to cause said condensable vapor to condense from said mixture, the gaseous mixture being cooled by heat exchange with heat exchange fluid in each zone which absorbs the heat of vaporization of said condensable vapor, causing said vapor to condense and the heat exchange fluid to increase in temperature;

recovering the condensable vapor-free gas upon passage through said series of separation zones;

recovering the condensate of said condensable vapor from each zone which has been removed from the gaseous mixture; and passing said condensate of said condensable vapor which has been recovered through a series of vaporization zones whereby said condensate passes in heat exchange relationship with said heat exchange fluid and is heated thereby, a gaseous stream comprising said vaporized condensate passing between said vaporization zones countercurrent to said condensate and being compressed as it passes between said zones to increase the temperature thereof, with the heat provided by said compression and by said heat exchange fluid being sufficient to vaporize at least a portion of said condensate.

7. The process of claim 6 wherein said condensate is heated in a series of vaporization zones of increasing temperature.

8. The process of claim 6 wherein an equal number of separation and vaporization zones are employed.

9. The process of claim 8 wherein a heat exchange fluid circulates between each separation zone and a corresponding vaporization zone whereby the heat recovered by said heat exchange fluid in said separation zone is employed in the vaporization of said condensate in said vaporization zone.

10. The process of claim 9 wherein the condensate which is recovered in each separation zone is passed to said corresponding vaporization zone.

* * * * *